US012782560B2

(12) United States Patent
Liang et al.

(10) Patent No.: US 12,782,560 B2
(45) Date of Patent: Nov. 3, 2026

(54) LIDAR AND METHOD FOR RANGE DETECTION USING LIDAR

(71) Applicant: HESAI TECHNOLOGY CO., LTD., Shanghai (CN)

(72) Inventors: Feng Liang, Shanghai (CN); Zhaoming Zeng, Shanghai (CN); Rui Wang, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 1007 days.

(21) Appl. No.: 17/902,682

(22) Filed: Sep. 2, 2022

(65) Prior Publication Data

US 2023/0003882 A1 Jan. 5, 2023

Related U.S. Application Data

(63) Continuation of application No. PCT/CN2021/078770, filed on Mar. 2, 2021.

(30) Foreign Application Priority Data

Mar. 6, 2020 (CN) ......................... 202010152086.5
Aug. 28, 2020 (CN) ......................... 202010889458.2

(51) Int. Cl.
*G01C 3/08* (2006.01)
*G01S 7/481* (2006.01)
(Continued)

(52) U.S. Cl.
CPC ............ *G01S 17/08* (2013.01); *G01S 7/4817* (2013.01); *G01S 7/4865* (2013.01); *G01S 7/487* (2013.01);
(Continued)

(58) Field of Classification Search
CPC ........ G01S 17/08; G01S 17/89; G01S 7/4817; G01S 7/4865; G01S 7/487; G01S 7/4915; G01S 7/493
See application file for complete search history.

(56) References Cited

U.S. PATENT DOCUMENTS 10,379,540 B2 * 8/2019 Droz ..................... G01S 7/4813
2017/0328990 A1 11/2017 Magee et al.
(Continued)

FOREIGN PATENT DOCUMENTS

CN 106291575 A * 1/2017 ............. G01S 17/08
CN 107271984 A 10/2017
(Continued)

OTHER PUBLICATIONS

PCT International Search Report and the Written Opinion mailed May 28, 2021, issued in related International Application No. PCT/CN2021/078770, with partial English translation (11 pages).
(Continued)

*Primary Examiner* — Mark Hellner
(74) *Attorney, Agent, or Firm* — Sheppard Mullin Richter & Hampton LLP

(57) ABSTRACT

A laser radar includes: an emitter including a laser array being configured to emit a plurality of laser beams for detecting a target object (OB); a receiver including a detector array being configured to receive echoes of the plurality of laser beams emitted from the laser array reflected by the target object (OB), and convert the echoes into electrical signals, where the laser array and the detector array form a plurality of detection channels, and each detection channel includes one laser and one detector; and a processor coupled to the emitter and the receiver, and configured to read a first electrical signal of a detector of a first detection channel and a second electrical signal of a detector of a second detection channel when a laser beam emitted from the laser array.

22 Claims, 9 Drawing Sheets

(51) Int. Cl.

| | |
|---|---|
| ***G01S 7/4865*** | (2020.01) |
| ***G01S 7/487*** | (2006.01) |
| ***G01S 7/4915*** | (2020.01) |
| ***G01S 7/493*** | (2006.01) |
| ***G01S 17/08*** | (2006.01) |
| ***G01S 17/89*** | (2020.01) |

(52) U.S. Cl.

CPC ............ *G01S 7/4915* (2013.01); *G01S 7/493* (2013.01); *G01S 17/89* (2013.01)

(56) References Cited

U.S. PATENT DOCUMENTS

| | | | | |
|---|---|---|---|---|
| 2018/0149753 | A1 | 5/2018 | Shin et al. | |
| 2020/0132851 | A1* | 4/2020 | Gassend | G01S 7/4817 |
| 2021/0096254 | A1* | 4/2021 | Vets | G01S 7/4817 |
| 2021/0223396 | A1* | 7/2021 | Butler | G02B 26/10 |

FOREIGN PATENT DOCUMENTS

| | | | |
|---|---|---|---|
| CN | 108196243 | A | 6/2018 |
| CN | 108614254 | A | 10/2018 |
| CN | 110646779 | A | 1/2020 |
| CN | 110780284 | A | 2/2020 |

OTHER PUBLICATIONS

First Search dated Apr. 19, 2022, issued in related Chinese Application No. 202010889458.2 (1 page).

First Office Action dated Apr. 24, 2022, issued in related Chinese Application No. 202010889458.2, with English machine translation (12 pages).

PCT International Preliminary Report on Patentability mailed Sep. 15, 2022, issued in related International Application No. PCT/CN2021/078770, with English translation (9 pages).

* cited by examiner

LIDAR AND METHOD FOR RANGE DETECTION USING LIDAR

CROSS-REFERENCE TO RELATED APPLICATIONS

This application is a continuation application of International Patent Application No. PCT/CN2021/078770, filed with the China National Intellectual Property Administration (CNIPA) on Mar. 2, 2021, which is based on and claims the priority to and benefits of Chinese Patent Application No. 202010152086.5 filed on Mar. 6, 2020 and Chinese Patent Application No. 202010889458.2 filed on Aug. 28, 2020. The entire content of all of the above-identified applications is incorporated herein by reference.

TECHNICAL FIELD

The present disclosure relates to the field of laser radar, and in particular, to laser radar and a ranging method for the laser radar.

BACKGROUND

Laser radar is a radar system that emits a laser beam to detect the position, velocity, and other characteristic quantities of a target. The laser radar usually includes an emission system, a receiving system, an information processing system, and other parts. The emission system usually includes various forms of laser beams and emission optical systems. The receiving system usually includes various forms of photoelectric detectors and receiving optical systems. The emission optical system and the receiving optical system may be independent or share a group of lenses. For laser radar with a non-coaxial optical system (that is, an emission optical system and a receiving optical system of laser radar use separate group of lenses, and optical axis of the group of emission lenses and optical axis of the group of receiving lenses do not coincide), during the ranging of a long-range target object, a beam emitted from a laser and the field of view of a detector are aligned at a long distance. That is, light obtained after the beam emitted from the laser is reflected by a long-range object is completely received by the detector. The laser and the detector that match in the field of view form one channel. Multi-line laser radar includes a plurality of channels. Within a relatively short range of the laser radar, light obtained after a beam emitted from a laser is reflected by an object reaches a detector, and a spot deviates and diffuses to fail to be completely received by a detector corresponding to a channel, resulting in the deterioration of short ranging performance.

To solve the problem of reduced short ranging capability and accuracy of laser radar caused by a non-coaxial optical system, two main technical solutions are available. In the first technical solution, a part of beam is split from an emitted beam, and the direction of the beam is changed to make the beam deviate toward the field of view of a detector. In the second technical solution, a micro-reflector is mounted near a detector to expand the field of view of the detector. The first method reduces laser energy used for long ranging. The ranging capability of the system is reduced, and the split small beam of the emitted beam may cause a problem that a false target is detected in extreme cases (for example, a corner-reflective road sign). In the second method, the field of view of the detector is expanded. The ambient light is increased, and the ranging capability of the system is reduced. The additionally increased field of view of the detector may also cause the problem that a false target is detected in extreme cases (for example, a corner-reflective road sign). In addition, in both the methods, the optical path of laser radar becomes more complex, the costs of material and alignment are increased, and the reliability of the system is reduced.

The content of the related art is merely technologies known to the inventor, and does not represent existing technologies in the field.

SUMMARY

Laser radar in the present invention uses a method of emitting a laser beam by using a single channel and receiving a laser beam by using multiple channels to solve the problem of insufficient detection capability due to a weak short-range echo signal of laser radar in the prior art.

In view of at least one defect in the prior art, the present invention provides laser radar, including:

an emitter, including a laser array, the laser array being configured to emit a plurality of laser beams for detecting a target object;

a receiver, including a detector array, the detector array being configured to receive echoes, reflected by the target object, of the plurality of laser beams emitted from the laser array and converting the echoes into electrical signals, where the laser array and the detector array form a plurality of detection channels, and each detection channel includes one laser and one detector; and a processor, coupled to the emitter and the receiver, and configured to read a first electrical signal of a first detector of a first detection channel and a second electrical signal of a second detector of a second detection channel in response to a laser beam emitted from the laser array.

According to an aspect of the present invention, the processor is configured to calculate a first distance between the target object and the laser radar and generate point cloud data according to the first electrical signal when the first electrical signal is greater than or equal to a first preset threshold.

According to an aspect of the present invention, the processor is configured to determine whether the second electrical signal is greater than or equal to a second preset threshold when the first electrical signal is less than a first preset threshold, and calculate a second distance between the target object and the laser radar according to the second electrical signal when the second electrical signal is greater than or equal to the second preset threshold, where the first preset threshold is less than or equal to the second preset threshold.

According to an aspect of the present invention, the processor is configured to generate point cloud data when the second distance between the target object and the laser radar calculated according to the second electrical signal is less than or equal to a second preset distance value.

According to an aspect of the present invention, the processor is configured to:

calculate a first distance between the target object and the laser radar according to the first electrical signal when the first electrical signal is greater than or equal to a first preset threshold;

calculate a second distance between the target object and the laser radar according to the second electrical signal when the second electrical signal is greater than or equal to a second preset threshold, wherein the first preset threshold is less than or equal to the second preset threshold; and when the first distance between the target object and the laser radar calculated according to the first electrical signal is greater than a first preset distance value, generate point cloud data according to the first distance calculated from the first electrical signal; and when the first distances is less than the first preset distance value and the second distance is less than a second preset distance value, compare the first electrical signal and the second electrical signal, select a stronger electrical signal from the first electrical signal and the second electrical signal, and generate point cloud data from a third distance calculated according to the stronger electrical signal.

According to an aspect of the present invention, the first detector of the first detection channel and the second detector of the second detection channel are adjacent or arranged at an interval, and the second detector of the second detection channel is arranged in a deviation direction of the first detector of the first detection channel, wherein the deviation direction is a direction pointing from an emission optical axis to a receiving optical axis.

According to an aspect of the present invention, the emitter and the receiver are arranged transversely in a horizontal direction.

According to an aspect of the present invention, the laser radar further includes a rotating shaft, a motor, and a rotor, where the motor is configured to drive the rotor to rotate around the rotating shaft, and the laser array and the detector array are arranged on the rotor.

According to an aspect of the present invention, the detector array comprises a plurality of columns arranged in the horizontal direction, each column comprises at least one detector, and the second detector of the second detection channel is adjacent to or at the interval from the first detector of the first detection channel in the horizontal direction and points to the deviation direction.

According to an aspect of the present invention, the emitter and the receiver are arranged vertically in a vertical direction.

According to an aspect of the present invention, the laser radar further includes a rotating mirror and a motor, where the rotating mirror is arranged downstream in an optical path of the emitter and upstream in an optical path of the receiver, the motor is configured to drive the rotating mirror to rotate, a laser beam emitted from the emitter is reflected toward outside of the laser radar by the rotating mirror, and an echo of the laser beam reflected by the target object is reflected by the rotating mirror to the receiver.

According to an aspect of the present invention, the detector array comprises at least one column arranged in a horizontal direction, each column comprises a plurality of detectors arranged in the vertical direction, and the second detector of the second detection channel is adjacent to or at an interval from the first detector of the first detection channel in the same column and points to the deviation direction.

According to an aspect of the present invention, the emitter is configured to control, when a first laser of the first detection channel emits a first laser beam a second laser of the second detection channel does not emit a second laser beam.

The present invention further relates to a ranging method for the foregoing laser radar, including:

emitting a laser beam toward outside of the laser radar by a laser array of the laser radar;

receiving an echo of the laser beam reflected by a target object; and reading a first electrical signal of a first detector of a first detection channel and a second electrical signal of a second detector of a second detection channel in response to the laser beam emitted from the laser array.

According to an aspect of the present invention, the method further includes:

calculating a first distance between the target object and the laser radar according to the first electrical signal and generating point cloud data when the first electrical signal is greater than or equal to a first preset threshold.

According to an aspect of the present invention, the method further includes:

determining whether the second electrical signal is greater than or equal to a second preset threshold when the first electrical signal is less than a first preset threshold; and calculating a second distance between the target object and the laser radar according to the second electrical signal when the second electrical signal is greater than or equal to the second preset threshold, where the first preset threshold is less than or equal to the second preset threshold.

According to an aspect of the present invention, the method further includes: generating point cloud data when the second distance between the target object and the laser radar calculated according to the second electrical signal is less than or equal to a second preset distance value.

According to an aspect of the present invention, the method further includes:

calculating a first distance between the target object and the laser radar according to the first electrical signal when the first electrical signal is greater than or equal to a first preset threshold;

calculating the second distance between the target object and the laser radar according to the second electrical signal when the second electrical signal is greater than or equal to a second preset threshold, where the first preset threshold is less than or equal to the second preset threshold; and when the first distance between the target object and the laser radar calculated according to the first electrical signal is greater than a first preset distance value, generating point cloud data according to the first distance calculated from the first electrical signal; and when the first distances is less than the first preset distance value and the second distance is less than a second preset distance value, comparing the first electrical signal and the second electrical signal, selecting a stronger electrical signal from the first electrical signal and the second electrical signal, and generating point cloud data from a third distance calculated according to the stronger electrical signal.

According to an aspect of the present invention, the first detector of the first detection channel and the second detector of the second detection channel are adjacent or arranged at an interval, and the second detector of the second detection channel is arranged in a deviation direction of the first detector of the first detection channel, where the deviation direction is a direction pointing from an emission optical axis to a receiving optical axis.

According to an aspect of the present invention, the method further includes:

reflecting the laser beam emitted from the laser array toward the outside of the laser radar by using a rotating mirror; and reflecting the echo of the laser beam reflected by the target object to the receiver by using the rotating mirror.

According to an aspect of the present invention, the emitter and the receiver are arranged vertically in a vertical direction, the laser radar further includes a motor, and the motor is configured to drive the rotating mirror to rotate; a detector array comprises at least one column arranged in a horizontal direction, and each column comprises a plurality of detectors arranged in the vertical direction; and the second detector of the second detection channel is adjacent to or at an interval from the first detector of the first detection channel in the same column and points to the deviation direction; and the ranging method further includes: controlling, when a first laser of the first detection channel emits a first laser beam, a second laser of the second detection channel does not emit a second laser beam.

According to an aspect of the present invention, the emitter and the receiver are arranged transversely in a horizontal direction, the laser radar further includes a rotating shaft, a motor, and a rotor, where the motor is configured to drive the rotor to rotate around the rotating shaft, and the laser array and the detector array are arranged on the rotor; a detector array comprises a plurality of columns arranged in the horizontal direction, and each column comprises at least one detector; and the second detector of the second detection channel is adjacent to or at an interval from the first detector of the first detection channel in the horizontal direction and points to the deviation direction; and the ranging method further includes: controlling, when a first laser of the first detection channel emits a first laser beam, a second laser of the second detection channel does not emit a second laser beam.

In the embodiments of the present invention, the characteristics of periodic arrangement of detectors and deviation and dispersion of spots are used, laser radar is set in a mode of emitting a laser beam by using a single channel and receiving a laser beam by using multiple channels, so that the short ranging capability and short ranging accuracy of the laser radar are improved on the premise that the measurement of a long-range target object of the laser radar is not affected.

BRIEF DESCRIPTION OF THE DRAWINGS

The drawings forming a part of the present disclosure are used to provide further understanding of the present disclosure, and the exemplary embodiments and description of the present disclosure are used to explain the present disclosure but do not constitute an improper limitation on the present disclosure. In the drawings.

DETAILED DESCRIPTION

Figure 1:
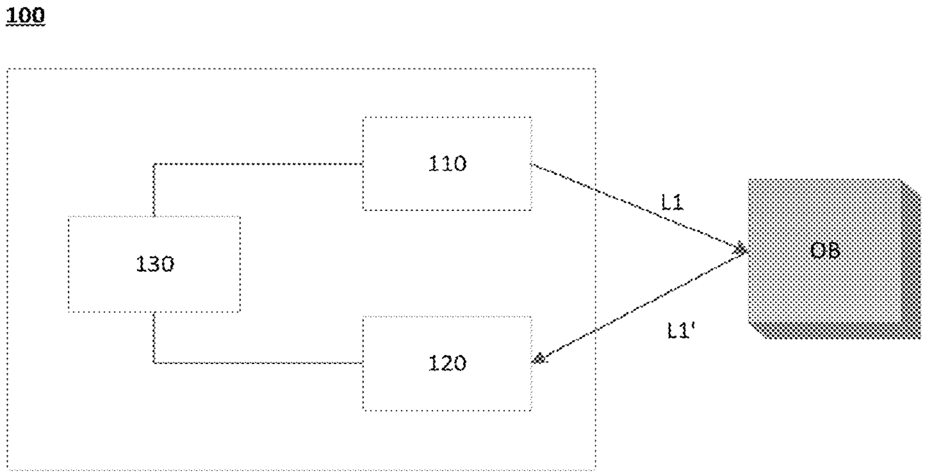
FIG. 1 is a block diagram of laser radar according to an embodiment of the present invention.

Only some exemplary embodiments are briefly described below. As those skilled in the art can realize, the described embodiments may be modified in various different ways without departing from the spirit or the scope of the present invention. Therefore, the drawings and the description are to be considered as illustrative in nature but not restrictive.

In the description of the present invention, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counter-clockwise" are orientations or position relationship shown based on the accompanying drawings, and are merely used for describing the present invention and simplifying the description, rather than indicating or implying that the apparatus or element should have a particular orientation or be constructed and operated in a particular orientation, and therefore, should not be construed as a limitation on the present invention. In addition, the terms "first" and "second" are used for descriptive purposes only and are not to be construed as indicating or implying relative importance or implicitly indicating the number of technical features indicated. Thus, features defined by "first" and "second" may explicitly or implicitly include one or more of the features. In the descriptions of the present invention, unless otherwise explicitly specified, "multiple" means two or more than two.

In the description of the present invention, it should be noted that, unless otherwise explicitly stipulated and restricted, terms "installation", "joint connection", and "connection" should be understood broadly, which, for example, may be a fixed connection, or may be a detachable connection, or an integral connection; or may be a mechanical connection, or may be an electrical connection, or may be mutual communication; or may be a direct connection, or may be an indirect connection by using a medium, or may be an internal communication between two components, or may be an interactive relationship between two components. Persons of ordinary skill in the art may understand the specific meanings of the foregoing terms in the present invention according to specific situations.

In the present invention, unless otherwise explicitly stipulated and restricted, that a first feature is "on" or "under" a second feature may include that the first and second features are in direct contact, or may include that the first and second features are not in direct contact but in contact by using other features therebetween. Moreover, the first feature being "over", "above", and "on" the second feature includes that the first feature is directly above or obliquely above the second feature, or merely means that the first feature has a larger horizontal height than the second feature. That the first feature is "below", "under", or "beneath" the second feature includes that the first feature is right below and at the inclined bottom of the second feature or merely indicates that a level of the first feature is lower than that of the second feature.

Many different implementations or examples are provided in the following disclosure to implement different structures of the present invention. To simplify the disclosure of the present invention, components and settings in particular examples are described below. Certainly, they are merely examples and are not intended to limit the present invention. In addition, in the present invention, reference numerals and/or reference letters may be repeated in different examples. The repetition is for the purposes of simplification and clearness, and does not indicate a relationship between various implementations and/or settings discussed. Moreover, the present invention provides examples of various particular processes and materials, but a person of ordinary skill in the art may be aware of application of another process and/or use of another material.

Preferred embodiments of the present invention are described below in detail with reference to the accompanying drawings. It should be understood that the preferred embodiments described herein are merely used to explain the present invention but are not intended to limit the present invention.

Figure 5:
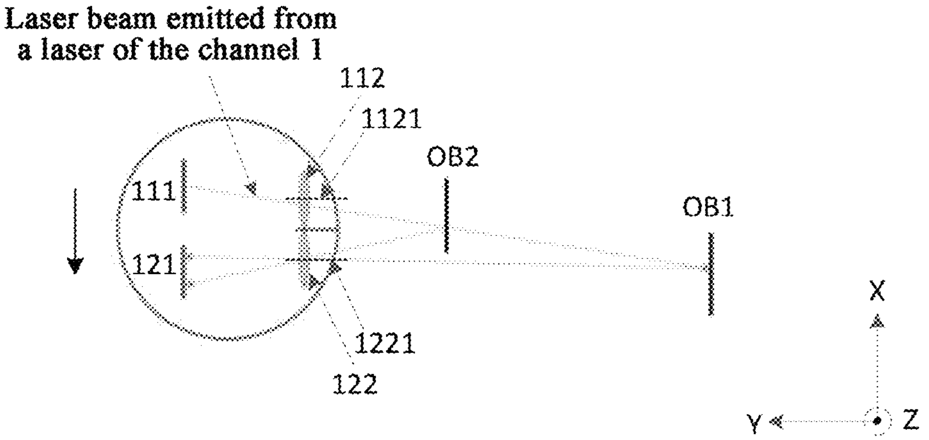
FIG. 5 is a schematic diagram of the reflection of a long-range object and a short-range object by laser radar on a non-coaxial optical path according to another embodiment of the present invention.
Figure 6:
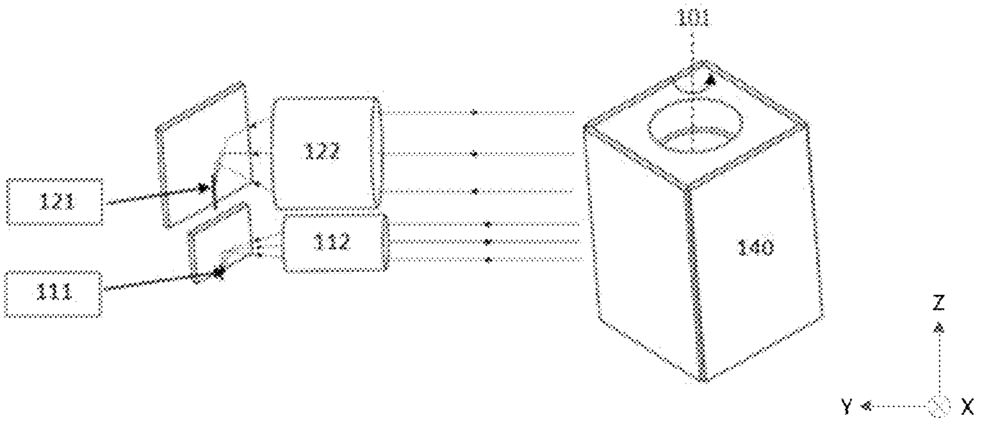
FIG. 6 is a structural diagram of laser radar according to an embodiment of the present invention.

FIG. 1 is a block diagram of laser radar 100 according to an embodiment of the present invention. As shown in the figure, the laser radar 100 includes an emitter 110, a receiver 120, and a processor 130. The emitter 110 includes a laser array 111 (referring to FIG. 2A and FIG. 4). The laser array 111 is configured to be capable of emitting a plurality of laser beams for detecting a target object OB. The laser beam is diffusely reflected by the target object OB. Reflected echoes return to the laser radar and are received by the receiver 120. The receiver 120 includes a detector array 121 (referring to FIG. 2A and FIG. 4). The detector array 121 is configured to be capable of receiving echoes, reflected by the detected target object OB, of the laser beams. According to a preferred embodiment of the present invention, the emitter 110 further includes a group of emission lenses 112 (as shown in FIG. 3, FIG. 5, and FIG. 6). The group of emission lenses 112 is arranged downstream in an optical path of the laser array 111 and is configured to modulate (collimate) the laser beams emitted from the laser array 111 and emit the modulated laser beams into ambient space around the laser radar 100. The receiver 120 further includes a group of receiving lenses 122 (as shown in FIG. 3, FIG. 5, and FIG. 6). The group of receiving lenses 122 is arranged upstream in an optical path of the detector array 121 and is configured to converge the echoes, reflected by the detected target object OB, of the emitted laser beams to the detector array 121. As shown in FIG. 1, a laser beam L1 emitted from the laser array 111 is modulated by the group of emission lenses to be projected onto the target object OB. Diffuse reflection occurs. A part of the laser beam is reflected to form an echo L1'. The detector array 121 receives the echo L1' reflected after the laser emits the laser beam, and converts the echo into an electrical signal. The laser array 111 and the detector array 121 form a plurality of detection channels, and each detection channel includes one laser and one detector, thereby forming a one-to-one correspondence relationship. In an ideal case, when one laser emits a laser beam, within a reserved time window, a detector corresponding to the laser receives a reflected echo, generates an electrical signal, and calculates a distance of the target object according to the electrical signal generated by the detector, to form point cloud data. The processor 130 may be coupled to the emitter 110 and the receiver 120, and configured to read a first electrical signal of the detector of one detection channel and a second electrical signal of the detector of at least another detection channel in response to a laser beam emitted from the laser of one detection channel. The processor 130 analyzes, for example, the first electrical signal and the second electrical signal, and performs determination and calculation on the signals according to a preset threshold, to generate point cloud data or determine that the point cloud data is an ineffective point cloud. Therefore, according to the embodiments of the present invention, when one laser emits a detection beam, both an electrical signal of a detector (that is, a detector of a channel in which the laser is arranged) corresponding to the laser and an electrical signal of at least another detector are read. This technical solution is especially very beneficial to the detection of a short-range target object. Details are described below.

According to an embodiment of the present invention, the emitter 110 and the receiver 120 may be arranged transversely in a horizontal direction or may be arranged vertically in a vertical direction in the laser radar 100.

Figure 2A:
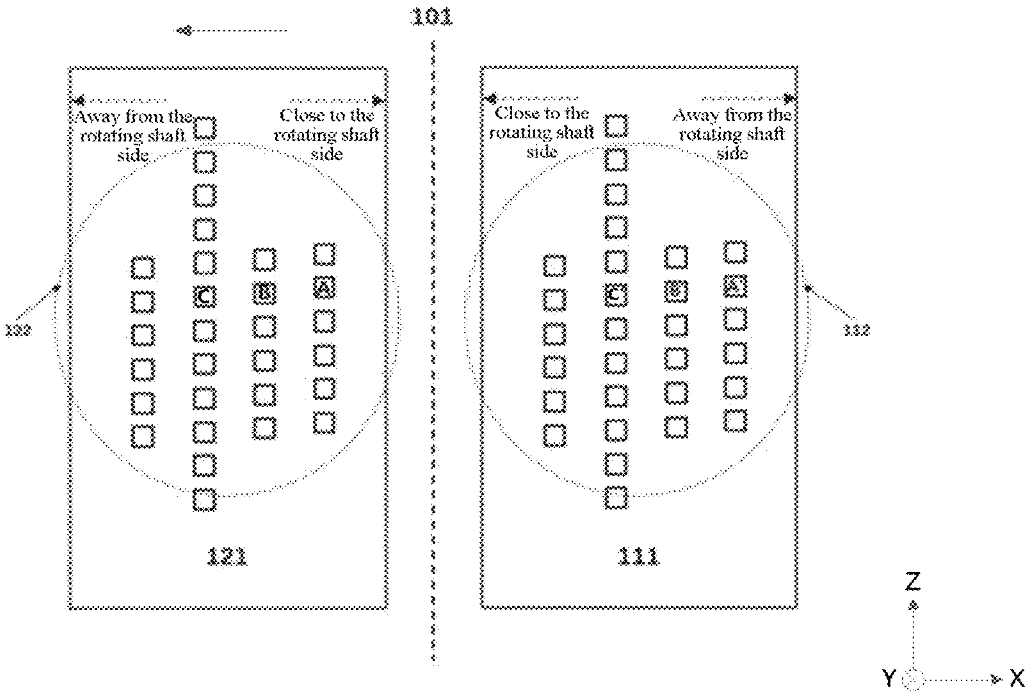
FIG. 2A is a schematic diagram of an emitter and a receiver being arranged transversely according to an embodiment of the present invention.
Figure 3:
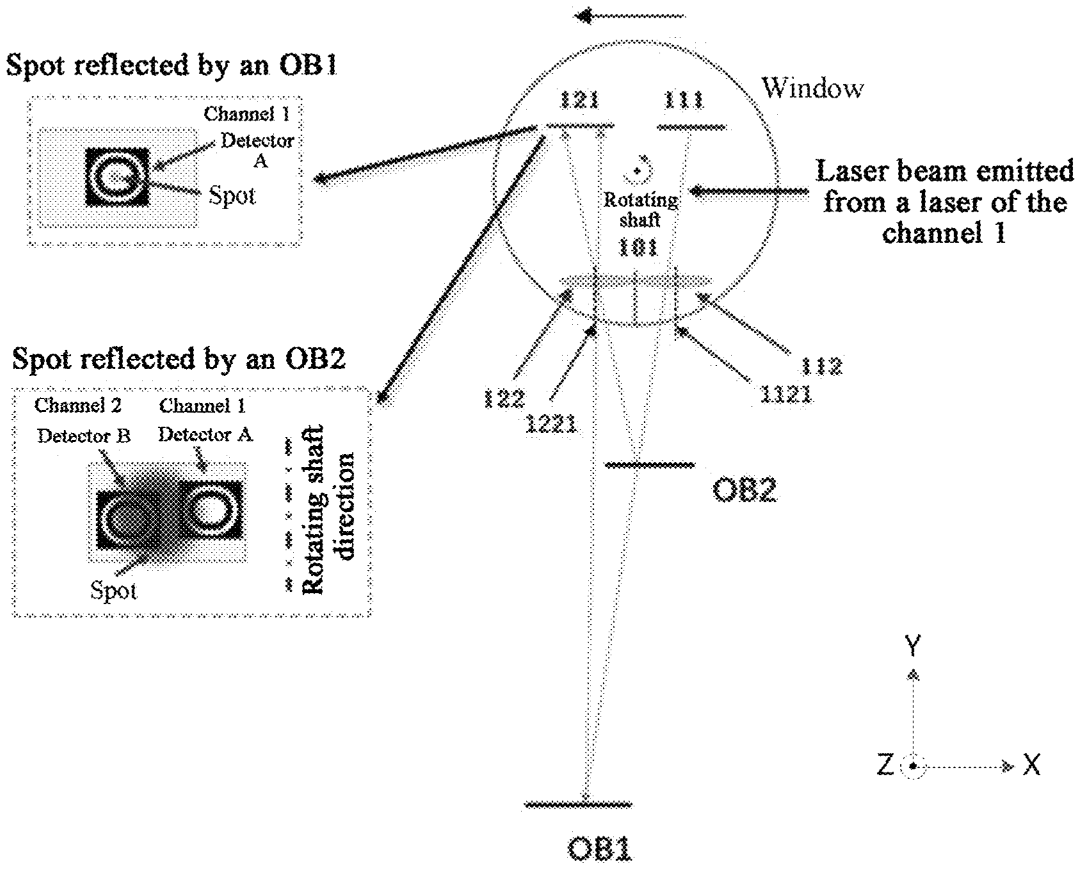
FIG. 3 is a schematic diagram of the reflection of a long-range object and a short-range object by laser radar on a non-coaxial optical path according to an embodiment of the present invention.

FIG. 2A and FIG. 3 show a case in which the emitter 110 and the receiver 120 are arranged transversely in the horizontal direction. The laser radar 100 includes a rotating shaft 101, a motor (not shown), and a rotor. The rotating shaft 101 is arranged inside the laser radar 100. The motor drives the rotor to rotate around the rotating shaft 101. The emitter 110 and the receiver 120 are arranged on the rotor, and rotate around the rotating shaft 101.

Figure 4:
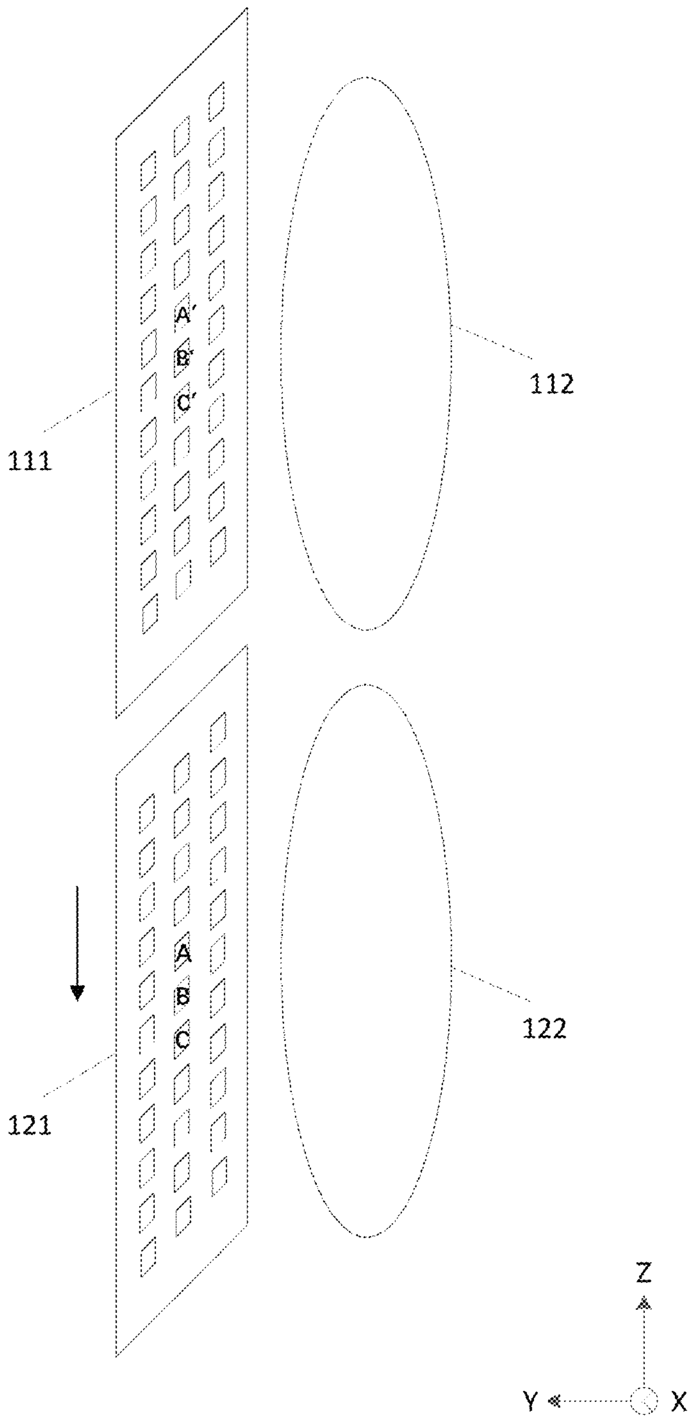
FIG. 4 is a schematic diagram of an emitter and a receiver being arranged vertically according to an embodiment of the present invention.

FIG. 4 and FIG. 6 show a case in which the emitter 110 and the receiver 120 are arranged vertically in the vertical direction. The laser radar 100 further includes a rotating mirror 140 (shown in FIG. 6) and a motor. The rotating mirror 140 is arranged downstream in an optical path of the emitter 110 and upstream in an optical path of the receiver 120. The motor is used for driving the rotating mirror 140 to rotate. A laser beam emitted from the emitter 110 is reflected outside the laser radar 100 by the rotating mirror 140. Echoes, reflected by the target object, of the laser beam are reflected by the rotating mirror 140 to the receiver 120. Further description is provided below with reference to the accompanying drawings.

Figure 2B:
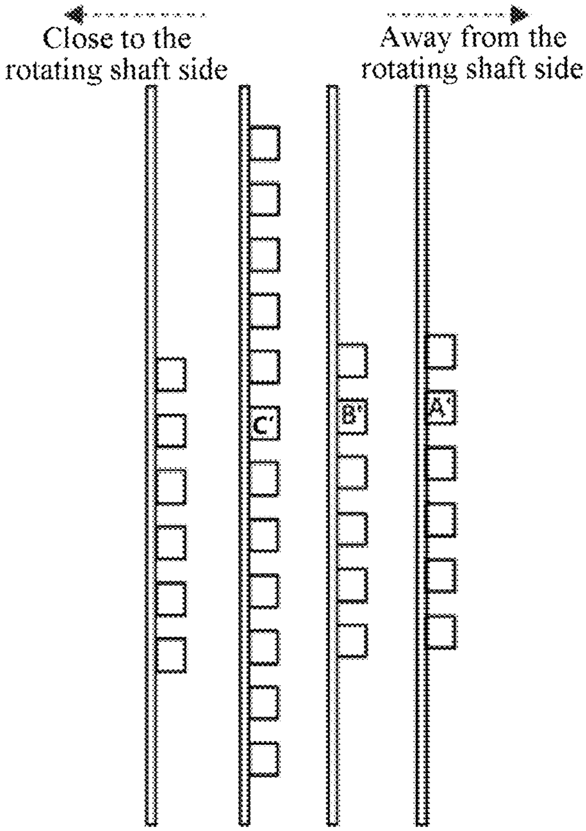
FIG. 2B shows a laser array according to another embodiment of the present invention.

As shown in FIG. 2A, referring to the coordinate system, the horizontal direction is a direction along an X axis in the figure. The rotating shaft 101 is in a direction along a Z axis. When the laser radar 100 is placed at the top of or around a vehicle, the Z axis is a direction basically perpendicular to the ground. The laser array 111 of the emitter 110 includes a plurality of independently controllable lasers, as shown by A', B', and C', including an edge-emitting laser or a vertical cavity surface emitting laser. The laser array 111 may be a laser array formed by individual lasers or linear array lasers or area array lasers. The detector array 121 is, for example, an array of detectors such as APDs, SiPMs and SPADs, as shown by A, B, or C shown in FIG. 2A. The detector array 121 is arranged in a plurality of columns in the horizontal direction (that is, the X direction in the figure). Each column includes at least one laser. When one column includes a plurality of laser beams, the plurality of laser beams are arranged in the vertical direction (that is, a direction perpendicular to the horizontal direction, that is, the Z direction). The arrangement of the laser array 111 corresponds to the arrangement of the detector array 121. As shown in FIG. 2A, the laser array 111 is also arranged in a plurality of columns in the horizontal direction. Each column includes at least one detector distributed in the vertical direction. According to a preferred embodiment of the present invention, it is designed that the laser array 111 and the detector array 121 have a translation relationship in the horizontal direction, as shown in FIG. 2A. Certainly, the laser array 111 and the detector array 121 may be arranged symmetrically in the horizontal direction. A laser and a detector that match in a long-range field of view usually form one channel (or detection channel). In the design of multi-line laser radar, the long ranging performance is generally preferentially ensured. In the design of an optical structure and an electronic circuit, the maximum efficiency of the radar is reached as much as possible at a long distance. When the detection channel includes one laser and one detector, in an ideal case, a laser beam emitted from the laser is diffusely reflected by a long-range target object to form echoes to be irradiated to the detector of the detection channel in which the laser is arranged. An example of a detection channel 1 and a detection channel 2 is used for description below. The detection channel 1 includes a laser A' and a detector A. The detection channel 2 includes a laser B' and a detector B. The detector B and the detector A are arranged adjacently in the horizontal direction. For example, in an ideal case, echoes generated after a laser beam emitted from the laser A' is diffusely reflected by a long-range target object are irradiated to the detector A of the detection channel 1 in which the laser A' is arranged. In an ideal case, echoes generated after a laser beam emitted from the laser B' is diffusely reflected by the long-range target object are irradiated to the detector B of the detection channel 2 in which the laser B' is arranged. Similar to the detection channel 1 and the detection channel 2, a detection channel 3 includes a laser C' and a detector C. The detector C and the detector A are arranged at an interval in the horizontal direction. Details are not described herein again. The plurality of laser beams of the laser array 111 shown in FIG. 2A are arranged on one substrate. The plurality of laser beams may be arranged on a plurality of substrates, as shown in FIG. 2B. The lasers are arranged at different heights in the vertical direction of a focal plane of the group of emission lenses. All these fall within the protection scope of the present invention. In addition, it needs to be noted that the emitter and the receiver are transversely interchangeable.

FIG. 3 is a schematic diagram of the reflection of a long-range object and a short-range object by laser radar 100 on a non-coaxial optical path according to an embodiment of the present invention. The non-coaxial optical path represents that an optical axis (that is, a receiving optical axis, as shown by 1221 in the figure) of a group of receiving lenses and an optical axis (that is, an emission optical axis, as shown by 1121 in the figure) of a group of emission lenses of the laser radar do not coincide. Similarly, a coaxial optical path represents that an optical axis of a group of receiving lenses and an optical axis of a group of emission lenses of the laser radar coincide. Detailed description is provided below with reference to the accompanying drawings.

As shown in FIG. 3, the emitter and the receiver are arranged transversely in the horizontal direction. When the laser radar 100 is used to detect a long-range object OB1, an echo that returns to the laser radar after the beam emitted from the laser A' of the detection channel 1 is reflected by the object are approximately parallel laser beams. A reflected spot of the echoes can be precisely received by the detector A (arranged in a focal plane of a receiving lens system), as shown by the upper left portion in FIG. 3. This is a relatively ideal case. However, when the laser radar 100 is used to detect a short-range object OB2, a reflected spot deviates in one direction, for example, the direction of the arrow in the figure, that is, a direction pointing from the emission optical axis 1121 to the receiving optical axis 1221. As shown in FIG. 3 and referring to the description in FIG. 2A, after the beam emitted from the laser A' of the detection channel 1 is reflected by a short-range object, approximately parallel laser beams cannot be formed. Therefore, the laser beams cannot be converged by the receiving lens system to the detector A (arranged in the focal plane of the receiving lens system) of the detection channel 1. The detector B of the detection channel 2 is also arranged in the focal plane of the receiving lens system, but is arranged in a deviation direction adjacent to the detector A of the detection channel 1. However, the deviation direction is the direction pointing from the emission optical axis 1121 to the receiving optical axis 1221 (the direction of the arrow shown in FIG. 2A and FIG. 3), and has a height different from a height of the detector A of the detection channel 1 in the focal plane. Due to spot diffusion, the detector B of the detection channel 2 also receives a part of the laser beams, or even most reflected spot is received by the detector B of the detection channel 2, as shown by the lower left portion in FIG. 3. When the distance between the target object OB and the laser radar 100 is small enough, the spot continues to diffuse in the deviation direction, and even the detector C of the detection channel 3 at an interval from the detection channel 1 also receives some laser beams or most laser beams (referring to FIG. 2A). Such spot deviation and diffusion cause optical crosstalk between the detection channels of the laser radar, which affects the ranging precision and the ranging accuracy of the laser radar.

FIG. 4 is a schematic diagram of an emitter and a receiver being arranged vertically according to an embodiment of the present invention. As shown in figure, referring to the coordinate system, the horizontal direction is a direction along an X axis in the figure, and the vertical direction is a direction along a Z axis in the figure. When the laser radar 100 is placed at the top of or around a vehicle, the Z axis is a direction perpendicular to the ground. The laser array 111 includes a plurality of independently controllable lasers, as shown by A', B', and C', including an edge-emitting laser or a vertical cavity surface emitting laser. The laser array 111 may be a laser array formed by individual lasers or linear array diode lasers or area array lasers, as shown by A, B, and C in FIG. 4. The detector array 121 is, for example, an array of detectors such as APDs, SiPMs, and SPADs. The detector array 111 is arranged in at least one column in the horizontal direction (that is, the X direction in the figure). Each column includes a plurality of detectors arranged in the vertical direction (that is, a direction perpendicular to the horizontal direction, that is, the Z direction). The arrangement of the laser array 111 corresponds to the arrangement of the detector array 121. As shown in FIG. 4, the laser array 111 is also arranged in at least one column in the horizontal direction. Each column includes a plurality of detectors arranged in the vertical direction. According to a preferred embodiment of the present invention, it is designed that the laser array 111 and the detector array 121 have a translation relationship in the vertical direction, as shown in FIG. 4. Certainly, the laser array 111 and the detector array 121 may be arranged symmetrically in the vertical direction. A laser and a detector that match in a long-range field of view usually form one channel (or detection channel). In the design of multi-line laser radar, the long ranging performance is generally preferentially ensured. In the design of an optical structure and an electronic circuit, the maximum efficiency of the radar is reached as much as possible at a long distance. When the detection channel includes one laser and one detector, in an ideal case, a laser beam emitted from the laser is diffusely reflected by a long-range target object to form echoes to be irradiated to the detector of the detection channel in which the laser is arranged. An example of a detection channel 1 and a detection channel 2 is used for description below. The detection channel 1 includes a laser A' and a detector A. The detection channel 2 includes a laser B' and a detector B. The detector B and the detector A are arranged adjacently in the vertical direction. For example, in an ideal case, echoes generated after a laser beam emitted from the laser A' is diffusely reflected by a long-range target object are irradiated to the detector A of the detection channel 1 in which the laser A' is arranged. In an ideal case, echoes generated after a laser beam emitted from the laser B' is diffusely reflected by the long-range target object are irradiated to the detector B of the detection channel 2 in which the laser B' is arranged. Similar to the detection channel 1 and the detection channel 2, a detection channel 3 includes a laser C' and a detector C. The detector C and the detector A are arranged at an interval in the vertical direction. Details are not described herein again. The plurality of laser beams of the laser array 111 shown in FIG. 4 are arranged on one substrate. The plurality of laser beams may be arranged on a plurality of substrates. The lasers are arranged at different heights in the vertical direction of a focal plane of the group of emission lenses. All these fall within the protection scope of the present invention.

FIG. 5 is a schematic diagram of the reflection of a long-range object and a short-range object by laser radar 100 on a non-coaxial optical path according to another embodiment of the present invention. As shown in FIG. 5, the emitter and the receiver are arranged vertically in the vertical direction. Referring to the case in FIG. 5, When the laser radar 100 is used to detect a long-range object OB1, an echo that returns to the laser radar after the beam emitted from the laser A' of the detection channel 1 is reflected by the object are approximately parallel laser beams. A reflected spot of the echoes can be precisely received by the detector A. This is a relatively ideal case. However, when the laser radar 100 is used to detect a short-range object OB2, a reflected spot deviates in one direction, for example, the direction of the arrow in the figure, that is, a direction pointing from the emission optical axis 1121 to the receiving optical axis 1221. As shown in FIG. 5 and referring to the description in FIG. 4, after the beam emitted from the laser A' of the detection channel 1 is reflected by a short-range object OB2, approximately parallel laser beams cannot be formed. Therefore, the laser beams cannot be converged by the receiving lens system to the detector A of the detection channel 1.

The detector B of another detection channel, that is, the detection channel 2, is also arranged in the focal plane of the receiving lens system, but is arranged in a deviation direction adjacent to the detector A of the detection channel 1. However, the deviation direction is the direction pointing from the emission optical axis 1121 to the receiving optical axis 1221 (the direction of the arrow shown in FIG. 4 and FIG. 5), and has a height different from a height of the detector A of the detection channel 1 in the focal plane. Due to spot diffusion, the detector B of the detection channel 2 also receives a part of the laser beams, or even most reflected spot is received by the detector B of the detection channel 2. That is, the echoes are received below the detector array 121 in the figure. When the distance between the target object OB and the laser radar 100 is small enough, the spot continues to diffuse in the deviation direction, and even the detector C of the detection channel 3 at an interval from the detection channel 1 also receives some laser beams or most laser beams (referring to FIG. 4). Such spot deviation and diffusion cause optical crosstalk between the detection channels of the laser radar, which affects the ranging precision and accuracy of the laser radar.

FIG. 6 is a structural diagram of laser radar according to an embodiment of the present invention. As shown in the figure, the emitter and the receiver of the laser radar are arranged vertically in the vertical direction (that is, the direction along the Z axis in the figure). Specifically, in the vertical direction, the laser array 111 is at the bottom and the detector array 121 is at the top. The group of emission lenses 112 is arranged downstream in an optical path of the laser array 111. The group of receiving lenses 122 is arranged upstream in an optical path of the detector array 121. The laser array 111 emits a laser beam. The laser beam is collimated by the group of emission lenses 112 to enter the rotating mirror 140. The motor drives the rotating mirror 140 to rotate around the rotating shaft 101 to implement a scan in the horizontal direction. The rotating shaft 101 is, for example, the direction along the Z axis perpendicular to the ground. The emitted beam is projected to a target object for diffuse reflection. A part of the laser beam is reflected back to form echoes. The echoes are converged by the group of receiving lenses 122 to enter the detector array 121. The processor 130 performs signal processing on the echoes to obtain the distance or/and reflectivity of the target object OB. In addition, it needs to be noted that the emitter and the receiver are vertically interchangeable. The rotating mirror is provided as a scan device in the foregoing embodiments. A person skilled in the art may understand that other similar scan mirrors such as a swinging mirror and a galvo also fall within the protection scope of the present invention.

It needs to be noted that the horizontal direction and the vertical direction discussed above are respectively a basically horizontal direction or a basically vertical direction. Due to factors such as a lamination error of a laser or a detector, there may be an error of, for example, −5° to 5°.

In summary, when a target object to be detected is near the laser radar, a part or most of a reflected spot of the target object may fail to be received by a detector of a current detection channel, but instead is received by a detector of a detection channel beside the current detection channel. When a target object to be detected is very close to the laser radar, very high energy is received by the detector of the detection channel beside the current detection channel, but a signal received by the detector of the current detection channel is very weak. In this case, if an electrical signal of the detector of the current detection channel is still used to calculate the distance of the target object, a large error may be generated, or even an incorrect conclusion may be reached.

A person skilled in the art should know that the described examples of the distance between the laser radar and the detected target object in the foregoing embodiments, for example, “far”, “near”, and “very close” are relative description but are not limited to absolute values. For the distance, a preset distance value may be determined according to spot deviation and diffusion degrees that are obtained from the lens parameters of the laser radar and change with a distance and the capability of recognizing an output signal of a detector by the system. Optionally, according to a preferred embodiment of the present invention, when the distance between the detected target object and the laser radar is less than five meters (certainly, the distance may be three meters or one meter), it is considered that the detected target object is near the laser radar. When the distance is greater than five meters, it is considered that the distance between the detected target object and the laser radar is relatively large.

Based on that the detector array 121 of the laser radar 100 cannot receive most echoes of a laser beam emitted from a laser in a current detection channel during the detection of a short-range target object, the applicant of the present invention proposes that when a laser of a detection channel emits a laser beam, both an electrical signal of a detector corresponding to one detection channel and an electrical signal of at least another detector are received. The electrical signal of the at least another detector is, for example, an electrical signal of a detector corresponding to a detection channel right next to the detector of the detection channel in the deviation direction, and is used as a short-range backup signal. For laser radar with an emitter and a receiver arranged transversely, the selection of another detector is further related to the field of view corresponding to the current detection channel. Preferably, another detector is closer to the zero-degree field of view of the laser radar than the current detector. In the present invention, the zero-degree field of view of the laser radar is the field of view corresponding to an optical axis of a group of emission lens/a group of receiving lens. When the field of view corresponding to a detection channel is higher than the zero-degree field of view, the field of view is positive, for example, further points to the sky direction relative to the zero-degree field of view. When the field of view corresponding to a detection channel is lower than the zero-degree field of view, the field of view is negative, for example, further points to the ground relative to the zero-degree field of view. For example, when the field of view corresponding to the current detection channel is negative, a detector corresponding to a detection channel right next to the detector of the detection channel in the deviation direction in a focal plane should be lower than the detector of the current detection channel. When the field of view corresponding to the current detection channel is positive, a detector corresponding to a detection channel right next to the detector of the detection channel in the deviation direction in a focal plane should be higher than the detector of the detection channel. If detecting that the electrical signal of the detector corresponding to the current detection channel is very weak or even detecting no electrical signal, the processor 130 starts to detect a short-range backup signal. If it is calculated that a distance value of the short-range backup signal is less than or equal to the preset distance value, the short-range backup signal is used as a short-range echo of the current channel. That is, for laser radar with a non-coaxial optical system, a method of using a single detection channel to emit a laser beam and multiple detection channels to receive echoes is used, so that the short ranging capability of non-coaxial laser radar can be greatly enhanced. Detailed description is provided below with reference to FIG. 7A and FIG. 7B.

Figure 7A:
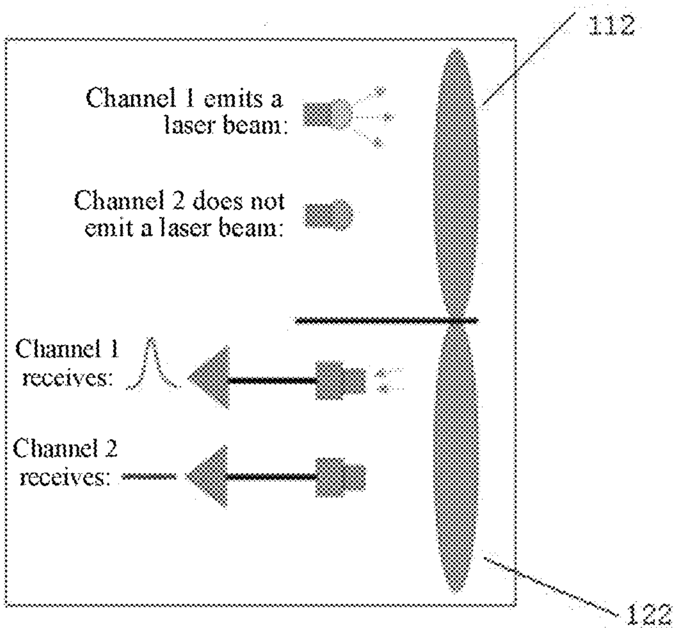
FIG. 7A is a schematic diagram of a relationship between emission and reception of long ranging according to an embodiment of the present invention.
Figure 7B:
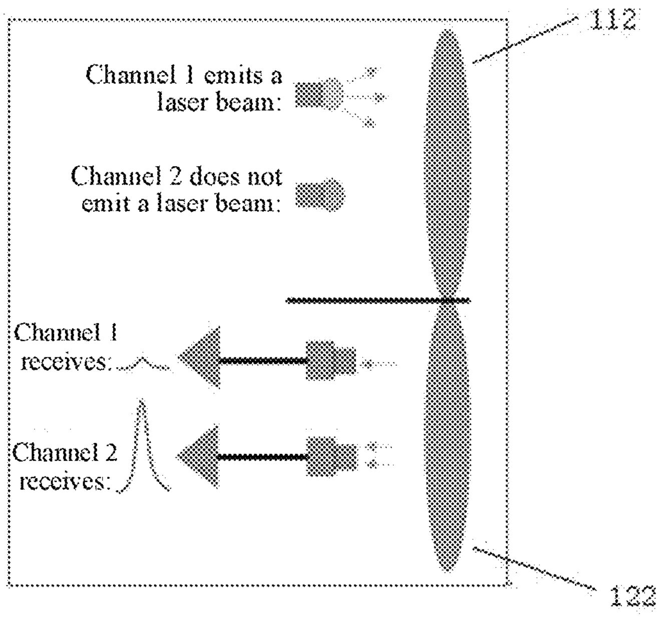
FIG. 7B is a schematic diagram of a relationship between emission and reception of short ranging according to an embodiment of the present invention.

FIG. 7A is a schematic diagram of a relationship between emission and reception of long ranging according to an embodiment of the present invention. FIG. 7B is a schematic diagram of the emission and reception of short ranging according to an embodiment of the present invention. The figures schematically show two adjacent detection channels, namely, a detection channel 1 and a detection channel 2. The detection channel 2 is optionally a channel adjacent to the detection channel 1 in the horizontal direction. For example, as shown in FIG. 2A, a detector B of the detection channel 2 is a detector that is adjacent to a detector A of the detection channel 1 in the horizontal direction and is in a deviation direction. Preferably, the detector B is lower than the detector A in a focal plane of a group of receiving lenses 122. The laser of the detection channel 1 is configured to emit a laser beam, and at the same time, it is set that the laser of the detection channel 2 beside the detection channel does not emit a laser beam. When a target object is relatively far away from the laser radar, as shown in FIG. 7A, a laser beam emitted from the laser of one detection channel 1 is collimated and emitted by a group of emission lenses and reflected by the target object. Subsequently, a group of receiving lenses converges echoes of the laser beam. The echoes are received by the detector of the detection channel 1, and the detector of the detection channel 2 nearly receives no echoes. In this case, an echo signal of the detection channel 1 is a valid detection value of the detection channel. When a target object is relatively close to the laser radar, as shown in FIG. 7B, a laser beam emitted from the laser of one detection channel 1 is collimated and emitted by a group of emission lenses and reflected by the target object. Subsequently, a group of receiving lenses converges echoes of the laser beam. Most of the echoes are received by the detector of the detection channel 2, and the detector of the detection channel 1 only receives a small part of echoes or even receives no echoes. In this case, an echo signal received by the detection channel 2 is used as the echo signal of the detection channel 1 for processing and computation and used as a valid detection value of the detection channel 1. As can be seen, when only the laser of the detection channel 1 is turned on, the distance between the detected target object and the laser radar has great impact on the echo reception of the detection channel 1 and the adjacent detection channel 2. According to an embodiment of the present invention, when a target object is close enough to the laser radar, referring to FIG. 2A and FIG. 4, a laser beam emitted from the laser of one detection channel 1 is collimated and emitted by a group of emission lenses and reflected by the target object. Subsequently, the group of receiving lenses converges echoes of the laser beam for detection by the detector. As discussed above, a spot further diffuses in the deviation direction. In this case, the echoes are received by a detector (that is, the detector of the detection channel 2) that is adjacent to and a detector (that is, a detector of a detection channel 3) at an interval from the detector of the detection channel 1. The detector of the detection channel 1 nearly receives no echoes. In this case, in addition to reading a signal (a first electrical signal) of the detector of the detection channel 1, a signal (a second electrical signal) of the detector of the detection channel 2 and a signal (a third electrical signal) of the detector of the detection channel 3 further need to be read. To simplify the description, in the following processing process, an example of reading signals of detectors of two channels is used. The idea of reading signals of detectors of a plurality of channels is also similar. Details are not described again. A ranging method in a mode of emitting a laser beam by using a single channel and receiving a laser beam by using multiple channels of laser radar and a process of processing and determining an echo signal are described below in detail with reference to FIG. 8 and FIG. 9.

Figure 8:
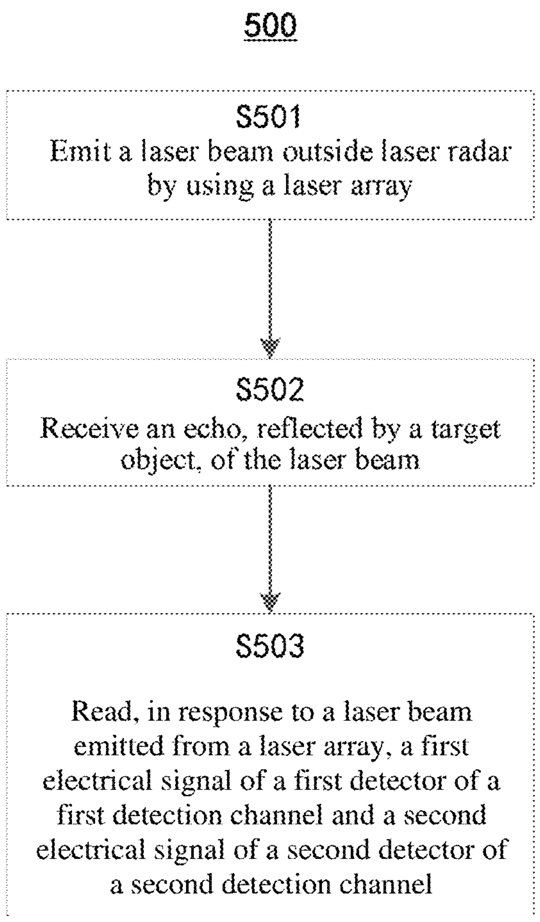
FIG. 8 is a flowchart of a ranging method for laser radar according to an embodiment of the present invention.

FIG. 8 shows a ranging method 500 for the foregoing laser radar according to an embodiment of the present invention. Details are described below with reference to the accompanying drawings.

As shown in FIG. 8: step S501: Emit a laser beam outside the laser radar by using the laser array.

Step S502: Receive an echo, reflected by a target object, of the laser beam.

Step S503: Read, in response to a laser beam emitted from a laser array, a first electrical signal of a first detector of a first detection channel and a second electrical signal of a second detector of a second detection channel. Subsequently, according to the first electrical signal and the second electrical signal, the distance of the target object may be calculated and point cloud data of the laser radar may be generated.

Figure 9:
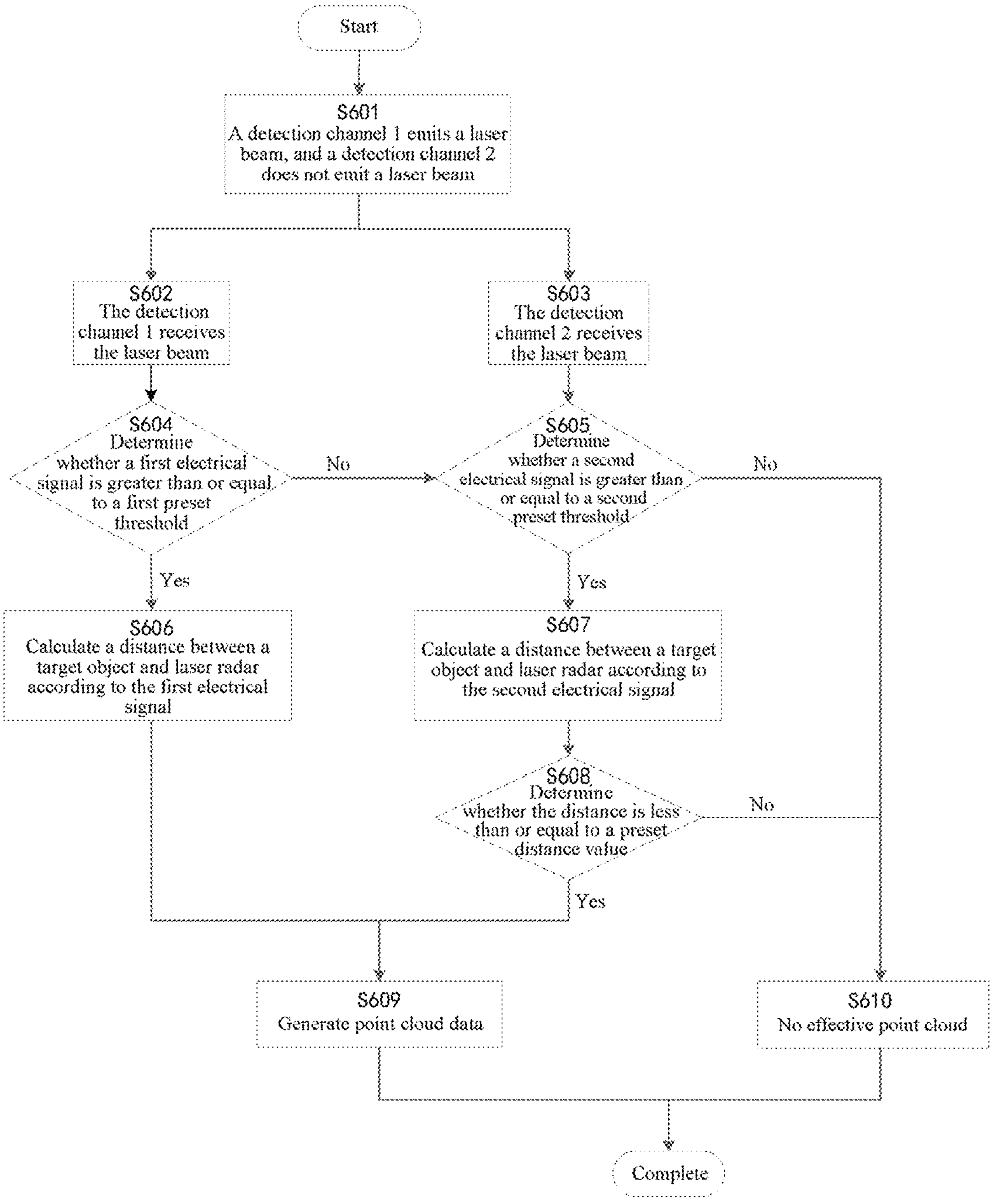
FIG. 9 is a flowchart of a ranging method for laser radar according to a preferred embodiment of the present invention.

FIG. 9 is a flowchart 600 of a ranging method in a mode of emitting a laser beam by using a single channel and receiving a laser beam by using multiple channels according to a preferred embodiment of the present invention. Two adjacent detection channels (that is, the detection channel 1 and the detection channel 2) shown in FIG. 7 are used as an example for description. After the laser of the detection channel 1 starts to emit a laser beam, the detectors of the detection channel 1 and the detection channel 2 both perform reception. Read electrical signals of the detectors are analyzed. If the detector of the detection channel 1 receives no echo signal or a very weak echo signal, an echo signal of the detector of the detection channel 2 is used. If the detection channel 2 has no echo that is strong enough, no object is detected in the current detection. If the detection channel 2 has an echo that is strong enough, the echo is parsed and calculated. If it is calculated by using the echo of the detection channel 2 that a detected object is close enough (less than or equal to a preset distance, for example, 5 m), it indicates that the signal is a reflected echo of laser emitted from the detection channel 1. The calculated value of the echo is used as a detected value of the detection channel 1, or otherwise no object is detected in the current detection. Detailed description is provided below.

Step S601: Control the detection channel 1 to emit a laser beam and the detection channel 2 not to emit a laser beam. That is, the laser of the detection channel 1 is controlled to emit a laser beam, and at the same time the laser of the detection channel 2 is turned off and emits no laser beam.

Step S602: The detection channel 1 receives the laser beam. After the laser of the detection channel 1 starts to emit a laser beam, the detector of the detection channel 1 receives an echo of the laser beam reflected by the target object, a first electrical signal of the detector of one detection channel 1 is read within a preset time window.

Step S603: The detection channel 2 receives the laser beam. For example, synchronous with Step S602, after the laser of the detection channel 1 starts to emit a laser beam, the detector of the detection channel 2 also receives an echo of the laser beam reflected by the target object, a second electrical signal of the detector of the detection channel 2 is read within a preset time window. It is not limited that the preset time windows in step S602 and step S603 overlap or not, provided that the preset time windows can satisfy that echoes reflected by a long-range target object and a short-range target object are received by a detector and can be read.

Step S604: Determine whether a first electrical signal is greater than or equal to a first preset threshold. The detector of the detection channel 1 receives an echo. An electrical signal converted from the echo is the first electrical signal. The value relationship between the first electrical signal and the first preset threshold is determined. When the detector of the detection channel 1 receives an echo that is strong enough, that is, the first electrical signal is greater than or equal to the first preset threshold, it indicates that a spot drift does not occur or a drift degree is small, the process turns to step S606 to calculate the distance between the target object and the laser radar according to the first electrical signal. When the detector of the detection channel 1 receives no echo or receives an echo with weak energy, that is, the first electrical signal is less than the first preset threshold, the process turns to step S605.

Step S605: Determine whether a second electrical signal is greater than or equal to a second preset threshold. When the detection channel 1 receives no echo or receives an echo with very weak energy, it is determined whether the second electrical signal generated by the detector of the detection channel 2 is greater than or equal to the second preset threshold. When the detector of the detection channel 2 receives an echo that is strong enough, that is, the second electrical signal is greater than or equal to the second preset threshold, it indicates that a spot drift may have occurred, and the process turns to step S607 to calculate the distance between the target object and the laser radar according to the second electrical signal, or otherwise, when the detector of the detection channel 2 receives no echo or receives an echo with weak energy, that is, the second electrical signal is less than the second preset threshold, the process turns to step S610. It is considered that there is no effective point cloud, that is, no object is detected in the current detection. The foregoing first preset threshold is less than or equal to the second preset threshold.

Step S606: Calculate a distance between a target object and laser radar according to the first electrical signal. When the first electrical signal converted from the echo received by the detection channel 1 is greater than or equal to the first preset threshold, the processor calculates the distance between the target object and the laser radar according to the first electrical signal. For example, the distance between the target object and the laser radar may be obtained according to a receiving time of receiving an echo by the detector of the detection channel 1 and an emission time of a detection beam based on a time-of-flight (TOF) ranging method (distance=time of flight*speed of light/2).

Step S607: Calculate a distance between a target object and laser radar according to the second electrical signal. When the second electrical signal converted from the echo received by the detection channel 2 is greater than or equal to the second preset threshold, the processor calculates the distance between the target object and the laser radar according to the second electrical signal. For example, the time-of-flight TOF ranging method in the foregoing step S606 may be used for distance calculation.

Step S608: Determine whether the distance is less than or equal to a preset distance value. That is, the value relationship between the preset distance value and the distance between the target object and the laser radar calculated according to step S607 is determined. When the calculated distance is less than or equal to the preset distance, it indicates that currently a short-range target object is detected and a spot drift has occurred. The process turns to step S609 to generate point cloud data according to the second electrical signal of the detector of the detection channel 2. Otherwise, when the calculated distance is greater than the preset distance, it indicates that currently a short-range target object is detected. In this case, the echo received by the detector of the detection channel 2 and the generated second electrical signal are not caused by a spot drift generated because the detection channel 1 detects a short-range target object, but may be caused by external ambient light or the like. Therefore, the process turns to step S610 to determine that there is no effective point cloud, that is, no object is detected in the current detection. The preset distance is optionally five meters. The function of step S608 is equivalent to secondary verification. That is, in a case that the detector of the detection channel 1 receives no echo signal that is strong enough and the detector of the detection channel 2 receives an echo signal that is strong enough, it is verified whether the current target object is a short-range target object (for example, at a distance within five meters from the laser radar). In the case of a short-range target object, the second electrical signal (and a distance value obtained based on the second electrical signal) is used in place of the first electrical signal (and a distance value obtained based on the first electrical signal) to generate the point cloud data of the laser radar. If the target object is not a short-range target object, the detection result is discarded, and it is considered that there is no effective point cloud.

Step S609: Generate point cloud data. The point cloud data of the laser radar is generated according to the distance data obtained in step S606, or the point cloud data of the laser radar is generated according to the distance data obtained in step S607.

Step S610: Determine that there is no effective point cloud. When the detection channel 2 receives no echo that is strong enough, that is, the second electrical signal is less than the second preset threshold, no effective point cloud is generated. Alternatively, the detection channel 2 receives an echo that is strong enough, and the second electrical signal is greater than or equal to the second preset threshold. However, the distance between the target object and the laser radar obtained through processing and calculation according to the electrical signal is greater than the preset distance value, for example, greater than a preset distance of five meters. Because the electrical signal is used for short ranging, in this case, it may be chosen to skip using or discard the electrical signal, so that the electrical signal is not used for generating the point cloud data. When no effective point cloud is generated, it indicates that no object is detected in the current detection.

In the foregoing steps, S604 to S610 may be performed by the processor of the laser radar. In steps S602 and S603, the step of reading an electrical signal may be performed by the processor of the laser radar.

In the foregoing embodiments, for example, the distance obtained in step S607 is used within the preset distance to generate the point cloud data of the laser radar, and the distance data obtained in step S606 is used beyond the preset distance to generate the point cloud data of the laser radar. In the entire detection range, the two parts of point cloud data may be spliced.

Figure 10:
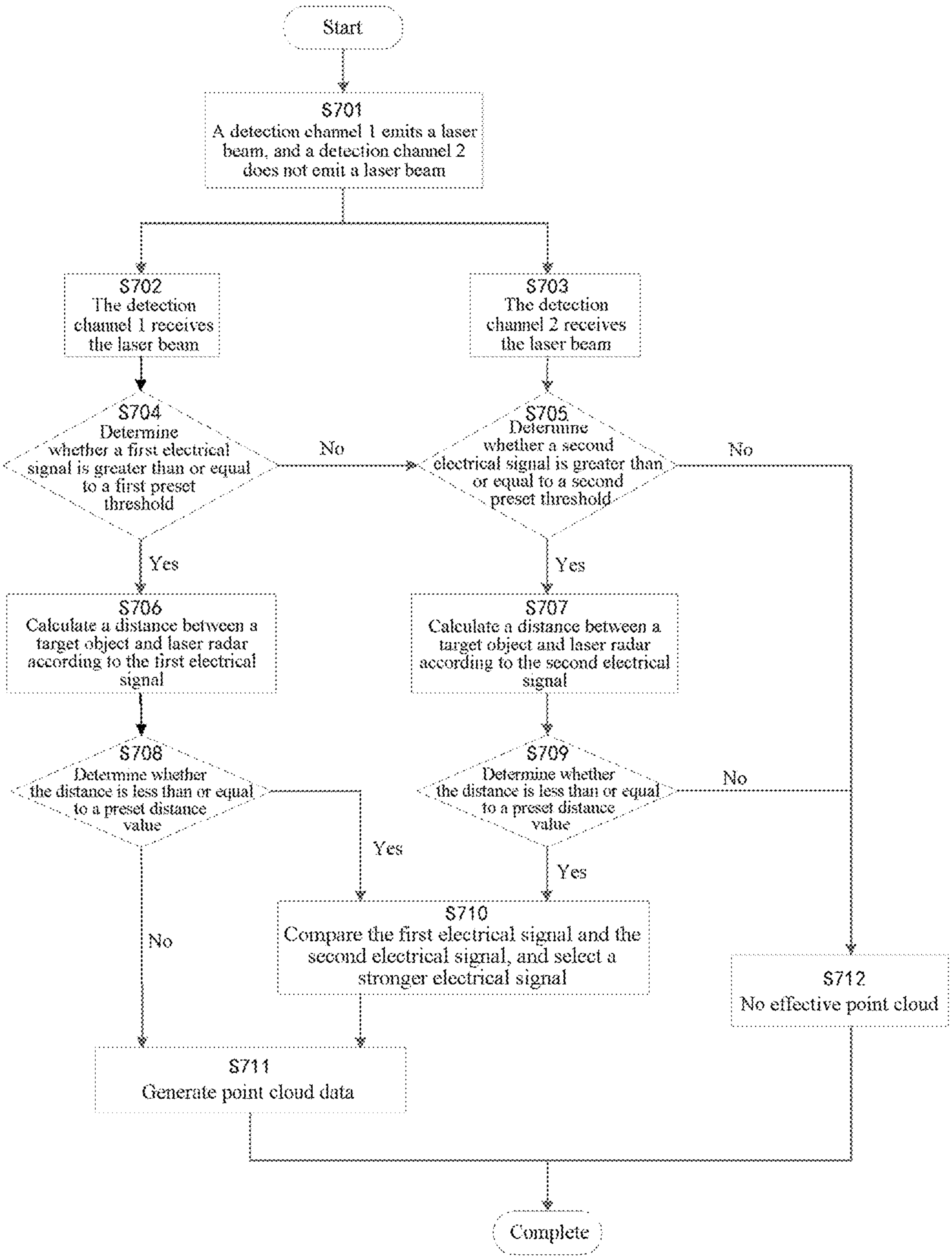
FIG. 10 is a flowchart of a ranging method for laser radar according to another preferred embodiment of the present invention.

FIG. 10 is a flowchart 700 of a ranging method in a mode of emitting a laser beam by using a single channel and receiving a laser beam by using multiple channels according to another preferred embodiment of the present invention. Two adjacent detection channels (that is, the detection channel 1 and the detection channel 2) shown in FIG. 7A are used as an example for description. After the laser of the detection channel 1 starts to emit a laser beam, the detectors of the detection channel 1 and the detection channel 2 both perform reception. Read electrical signals of the detectors are analyzed. If the detector of the detection channel 1 receives no echo signal or a very weak echo signal, an echo signal of the detector of the detection channel 2 is used. If the detection channel 2 has no echo that is strong enough, no object is detected in the current detection. If the detection channel 2 has an echo that is strong enough, the echo is parsed and calculated. If it is calculated by using the echo of the detection channel 2 that a detected object is close enough (less than or equal to a preset distance, for example, 5 m), the strength of the echoes received by the detection channel 1 and the detection channel 2 is compared, and a detection channel with high strength is selected. A calculated value of an echo in the channel is outputted as a detected value of the detection channel 1, or otherwise no object is detected in the current detection. Detailed description is provided below.

Step S701: Control the detection channel 1 to emit a laser beam and the detection channel 2 not to emit a laser beam. That is, the laser of the detection channel 1 is controlled to emit a laser beam, and at the same time the laser of the detection channel 2 is turned off and emits no laser beam.

Step S702: The detection channel 1 receives the laser beam. After the laser of the detection channel 1 starts to emit a laser beam, the detector of the detection channel 1 receives an echo of the laser beam reflected by the target object, a first electrical signal of the detector of one detection channel 1 is read within a preset time window.

Step S703: The detection channel 2 receives the laser beam. For example, synchronous with Step S702, after the laser of the detection channel 1 starts to emit a laser beam, the detector of the detection channel 2 also receives an echo of the laser beam reflected by the target object, a second electrical signal of the detector of the detection channel 2 is read within a preset time window. It is not limited that the preset time windows in step S702 and step S703 overlap or not, provided that the preset time windows can satisfy that echoes reflected by a long-range target object and a short-range target object are received by a detector and can be read.

Step S704: Determine whether a first electrical signal is greater than or equal to a first preset threshold. The detector of the detection channel 1 receives an echo. An electrical signal converted from the echo is the first electrical signal. The value relationship between the first electrical signal and the first preset threshold is determined. When the detector of the detection channel 1 receives an echo that is strong enough, that is, the first electrical signal is greater than or equal to the first preset threshold, it indicates that a spot drift does not occur or a drift degree is small, the process turns to step S706 to calculate the distance between the target object and the laser radar according to the first electrical signal. When the detector of the detection channel 1 receives no echo or receives an echo with weak energy, that is, the first electrical signal is less than the first preset threshold, the process turns to step S705.

Step S705: Determine whether a second electrical signal is greater than or equal to a second preset threshold. When the detection channel 1 receives no echo or receives an echo with very weak energy, it is determined whether the second electrical signal generated by the detector of the detection channel 2 is greater than or equal to the second preset threshold. When the detector of the detection channel 2 receives an echo that is strong enough, that is, the second electrical signal is greater than or equal to the second preset threshold, it indicates that a spot drift may have occurred, and the process turns to step S707 to calculate the distance between the target object and the laser radar according to the second electrical signal, or otherwise, when the detector of the detection channel 2 receives no echo or receives an echo with weak energy, that is, the second electrical signal is less than the second preset threshold, the process turns to step S712. It is considered that there is no effective point cloud, that is, no object is detected in the current detection. The foregoing first preset threshold is less than or equal to the second preset threshold.

Step S706: Calculate a distance between a target object and laser radar according to the first electrical signal. When the first electrical signal converted from the echo received by the detection channel 1 is greater than or equal to the first preset threshold, the processor calculates the distance between the target object and the laser radar according to the first electrical signal.

For example, the distance between the target object and the laser radar may be obtained according to a receiving time of receiving an echo by the detector of the detection channel 1 and an emission time of a detection beam based on a time-of-flight (TOF) ranging method (distance=time of flight*speed of light/2). The process then turns to step S708.

Step S707: Calculate a distance between a target object and laser radar according to the second electrical signal. When the second electrical signal converted from the echo received by the detection channel 2 is greater than or equal to the second preset threshold, the processor calculates the distance between the target object and the laser radar according to the second electrical signal. For example, the time-of-flight TOF ranging method in the foregoing step S706 may be used for distance calculation. The process then turns to step S709.

Step S708: Determine whether the distance is less than or equal to a preset distance value. That is, the value relationship between the preset distance value and the distance between the target object and the laser radar calculated according to step S706 is determined. When the calculated distance is less than or equal to the preset distance, it indicates that currently a short-range target object is detected. In this case, although the spot has deviated, the spot still covers a part of the detector of the detection channel 1, and the first electrical signal is still greater than or equal to the first preset threshold. In this case, the process turns to step S710. When the calculated distance is greater than the preset distance, it indicates that currently a short-range target object is detected. In this case, the echo received by the detector of the detection channel 1 and the generated first electrical signal are directly outputted. Therefore, the process turns to step S711 to generate the point cloud data. The current detection is completed. The preset distance is optionally five meters.

Step S709: Determine whether the distance is less than or equal to a preset distance value. That is, the value relationship between the preset distance value and the distance between the target object and the laser radar calculated according to step S707 is determined. When the calculated distance is less than or equal to the preset distance, it indicates that currently a short-range target object is detected, and the process turns to step S710. Otherwise, when the calculated distance is greater than the preset distance, it indicates that currently a short-range target object is detected. In this case, the echo received by the detector of the detection channel 2 and the generated second electrical signal are not caused by a spot drift generated because the detection channel 1 detects a short-range target object, but may be caused by external ambient light or the like. Therefore, the process turns to step S712 to determine that there is no effective point cloud, that is, no object is detected in the current detection. The preset distance is optionally five meters.

Step S710: Compare the first electrical signal and the second electrical signal, and select a stronger electrical signal. The function of step S710 is equivalent to secondary verification. That is, the distance calculated by using the first electrical signal in step S708 and the distance calculated by using the second electrical signal in step S709 are both less than the preset distance value, the strength of the first electrical signal and the second electrical signal is compared again to select a stronger electrical signal for output, and a weaker electrical signal is discarded.

Step S711: Generate point cloud data. The point cloud data of the laser radar is generated according to the distance data obtained in step S708, or the point cloud data of the laser radar is generated according to the distance obtained from the stronger electrical signal calculated in step S710.

Step S712: Determine that there is no effective point cloud. When the detection channel 2 receives no echo that is strong enough, that is, the second electrical signal is less than the second preset threshold, no effective point cloud is generated. Alternatively, the detection channel 2 receives an echo that is strong enough, and the second electrical signal is greater than or equal to the second preset threshold. However, the distance between the target object and the laser radar obtained through processing and calculation according to the electrical signal is greater than the preset distance value, for example, greater than a preset distance of five meters. Because the electrical signal is used for short ranging, in this case, it may be chosen to skip using or discard the electrical signal, so that the electrical signal is not used for generating the point cloud data. When no effective point cloud is generated, it indicates that no object is detected in the current detection.

In the foregoing steps, S704 to S712 may be performed by the processor of the laser radar. In steps S702 and S703, the step of reading an electrical signal may be performed by the processor of the laser radar.

In the foregoing embodiments, for example, the distance obtained in step S710 is used during the determination and selection of a stronger electrical signal to generate the point cloud data of the laser radar, and the distance data obtained in step S708 is used beyond the preset distance to generate the point cloud data of the laser radar. In the entire detection range, the two parts of point cloud data may be spliced.

The present invention is found by the inventor based on the following discovery: when the laser radar detects a short-range target object, a spot reflected back to a detector deviates and diffuses, and as a result energy received by a detector in a current channel is low, and a detector in a channel beside the current channel receives a lot of energy. Based on the foregoing discovery, for the ranging problem of laser radar, the present invention provides a mode of using a single-channel laser to emit a laser beam and multi-channel detectors for reception, so that the capability and accuracy of detecting a short-range target object of the laser radar can be improved on the premise that the remote detection capability of the laser radar is not affected.

It should be finally noted that the foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made and the like within the spirit and principle of the present invention shall fall within the protection scope of the present invention.

What is claimed is:

1. Laser radar, comprising:

an emitter, comprising a laser array, the laser array being configured to emit a plurality of laser beams for detecting a target object;

a receiver, comprising a detector array, the detector array being configured to receive echoes, reflected by the target object, of the plurality of laser beams emitted from the laser array and converting the echoes into electrical signals, wherein the laser array and the detector array form a plurality of detection channels, and each detection channel comprises one laser and one detector; the plurality of detection channels includes a first detection channel and a second detection channel, wherein the first detection channel comprises a first laser and a first detector, and the second detection channel comprises a second laser and a second detector; and a processor, coupled to the emitter and the receiver, and configured to read a first electrical signal of the first detector and a second electrical signal of the second detector in response to a first laser beam emitted from the first laser, wherein the first electrical signal and the second electrical signal are both generated in response to an echo of the first laser beam reflected by the target object; and determine target object information corresponding to the first detection channel according to the first electrical signal and the second electrical signal.

2. The laser radar according to claim 1, wherein the processor is configured to calculate a first distance between the target object and the laser radar and to generate point cloud data according to the first electrical signal when the first electrical signal is greater than or equal to a first preset threshold.

3. The laser radar according to claim 1, wherein the processor is configured to determine whether the second electrical signal is greater than or equal to a second preset threshold when the first electrical signal is less than a first preset threshold, and calculate a second distance between the target object and the laser radar according to the second electrical signal when the second electrical signal is greater than or equal to the second preset threshold, wherein the first preset threshold is less than or equal to the second preset threshold.

4. The laser radar according to claim 3, wherein the processor is configured to generate point cloud data when the second distance between the target object and the laser radar calculated according to the second electrical signal is less than or equal to a second preset distance value.

5. The laser radar according to claim 1, wherein the processor is configured to:

calculate a first distance between the target object and the laser radar according to the first electrical signal when the first electrical signal is greater than or equal to a first preset threshold;

calculate a second distance between the target object and the laser radar according to the second electrical signal when the second electrical signal is greater than or equal to a second preset threshold, wherein the first preset threshold is less than or equal to the second preset threshold; and when the first distance between the target object and the laser radar calculated according to the first electrical signal is greater than a first preset distance value, generate point cloud data according to the first distance calculated from the first electrical signal; and when the first distance is less than the first preset distance value and the second distance is less than a second preset distance value, compare the first electrical signal and the second electrical signal, select a stronger electrical signal from the first electrical signal and the second electrical signal, and generate point cloud data from a third distance calculated according to the stronger electrical signal.

6. The laser radar according to claim 1, wherein the first detector of the first detection channel and the second detector of the second detection channel are adjacent or arranged at an interval, and the second detector of the second detection channel is arranged in a deviation direction of the first detector of the first detection channel, wherein the deviation direction is a direction pointing from an emission optical axis to a receiving optical axis.

7. The laser radar according to claim 6, wherein the emitter and the receiver are arranged transversely in a horizontal direction.

8. The laser radar according to claim 7, further comprising a rotating shaft, a motor, and a rotor, wherein the motor is configured to drive the rotor to rotate around the rotating shaft, and the laser array and the detector array are arranged on the rotor.

9. The laser radar according to claim 8, wherein the detector array comprises a plurality of columns arranged in the horizontal direction, each column comprises at least one detector, and the second detector of the second detection channel is adjacent to or at the interval from the first detector of the first detection channel in the horizontal direction and points to the deviation direction.

10. The laser radar according to claim 6, wherein the emitter and the receiver are arranged vertically in a vertical direction.

11. The laser radar according to claim 10, further comprising a rotating mirror and a motor, wherein the rotating mirror is arranged downstream in an optical path of the emitter and upstream in an optical path of the receiver, the motor is configured to drive the rotating mirror to rotate, a laser beam emitted from the emitter is reflected toward outside of the laser radar by the rotating mirror, and an echo of the laser beam reflected by the target object is reflected by the rotating mirror to the receiver.

12. The laser radar according to claim 11, wherein the detector array comprises at least one column arranged in a horizontal direction, each column comprises a plurality of detectors arranged in the vertical direction, and the second detector of the second detection channel is adjacent to or at an interval from the first detector of the first detection channel in the same column and points to the deviation direction.

13. The laser radar according to claim 1, wherein the emitter is configured to control the first laser of the first detection channel to emit a first laser beam while the second laser of the second detection channel does not emit a second laser beam.

14. A ranging method for a laser radar, wherein the laser radar comprises an emitter comprising a laser array and a receiver comprising a detector array, wherein the laser array and the detector array form a plurality of detection channels, each detection channel comprises one laser and one detector, the plurality of detection channels includes a first detection channel and a second detection channel, the first detection channel comprises a first laser and a first detector, and the second detection channel comprises a second laser and a second detector, the ranging method comprising:

emitting a first laser beam toward outside of the laser radar by the first laser of the laser array of the laser radar, the first laser corresponding to the first detection channel;

receiving an echo of the first laser beam reflected by a target object;

reading a first electrical signal of the first detector of the first detection channel and a second electrical signal of the second detector of the second detection channel in response to the first laser beam emitted from the first laser of the laser array, wherein the first electrical signal and the second electrical signal are both generated in response to the echo of the first laser beam reflected by the target object; and determining target object information corresponding to the first detection channel according to the first electrical signal and the second electrical signal.

15. The ranging method according to claim 14, further comprising:

calculating a first distance between the target object and the laser radar according to the first electrical signal when the first electrical signal is greater than or equal to a first preset threshold to generate point cloud data.

16. The ranging method according to claim 14, further comprising:

determining whether the second electrical signal is greater than or equal to a second preset threshold when the first electrical signal is less than a first preset threshold; and calculating a second distance between the target object and the laser radar according to the second electrical signal when the second electrical signal is greater than or equal to the second preset threshold, wherein the first preset threshold is less than or equal to the second preset threshold.

17. The ranging method according to claim 16, further comprising: generating point cloud data when the second distance between the target object and the laser radar calculated according to the second electrical signal is less than or equal to a second preset distance value.

18. The ranging method according to claim 14, further comprising:

calculating a first distance between the target object and the laser radar according to the first electrical signal when the first electrical signal is greater than or equal to a first preset threshold;

calculating a second distance between the target object and the laser radar according to the second electrical signal when the second electrical signal is greater than or equal to a second preset threshold, wherein the first preset threshold is less than or equal to the second preset threshold; and when the first distance between the target object and the laser radar calculated according to the first electrical signal is greater than a first preset distance value, generating point cloud data according to the first distance calculated from the first electrical signal; and when the first distance is less than the first preset distance value and the second distance is less than a second preset distance value, comparing the first electrical signal and the second electrical signal, selecting a stronger electrical signal from the first electrical signal and the second electrical signal, and generating point cloud data from a third distance calculated according to the stronger electrical signal.

19. The ranging method according to claim 14, wherein the first detector of the first detection channel and the second detector of the second detection channel are adjacent or arranged at an interval, and the second detector of the second detection channel is arranged in a deviation direction of the first detector of the first detection channel, where the deviation direction is a direction pointing from an emission optical axis to a receiving optical axis.

20. The ranging method according to claim 14, further comprising:

reflecting the first laser beam emitted from the laser array toward the outside of the laser radar by using a rotating mirror; and reflecting the echo of the first laser beam reflected by the target object to the receiver by using the rotating mirror.

21. The ranging method according to claim 20, wherein the emitter and the receiver are arranged vertically in a vertical direction, the laser radar further comprises a motor, and the motor is configured to drive the rotating mirror to rotate; a detector array comprises at least one column arranged in a horizontal direction, and each column comprises a plurality of detectors arranged in the vertical direction; and the second detector of the second detection channel is adjacent to or at an interval from the first detector of the first detection channel in the same column and points to a deviation direction pointing from an emission optical axis to a receiving optical axis; and the ranging method further comprises: controlling, when the first laser of the first detection channel emits the first laser beam, a second laser of the second detection channel does not emit a second laser beam.

22. The ranging method according to claim 14, wherein the emitter and the receiver are arranged transversely in a horizontal direction, the laser radar further comprises a rotating shaft, a motor, and a rotor, wherein the motor is configured to drive the rotor to rotate around the rotating shaft, and the laser array and the detector array are arranged on the rotor;

a detector array comprises a plurality of columns arranged in the horizontal direction, and each column comprises at least one detector; and the second detector of the second detection channel is adjacent to or at an interval from the first detector of the first detection channel in the horizontal direction and points to a deviation direction pointing from an emission optical axis to a receiving optical axis; and the ranging method further comprises: controlling, when the first laser of the first detection channel emits the first laser beam, a second laser of the second detection channel does not emit a second laser beam.

* * * * *